United States Patent Office 3,214,446
Patented Oct. 26, 1965

3,214,446
3-(AMINOALKOXY)-ESTRA-1,3,5(10)-TRIEN-17β-OL COMPOUNDS
David Darwin Evans, Staines, Middlesex, David Eurof Evans, Surrey, and Peter John Palmer, Twickenham, Middlesex, England, assignors to Parke, Davis & Company, Detroit, Mich., a corporation of Michigan
No Drawing. Filed Jan. 15, 1964, Ser. No. 337,755
Claims priority, application Great Britain, Jan. 17, 1963, 2,197/63
4 Claims. (Cl. 260—397.5)

The present invention relates to novel aminoalkoxy-steroid compounds and to methods for their production. More particularly, the invention relates to 3-(aminoalkoxy)-estra-1,3,5(10)-trien-17β-ol compounds having the formula

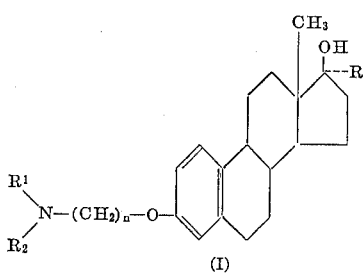

and to acid-addition salts thereof; where $n$ is a positive integer greater than 1 and less than 6; $R_1$ represents a lower alkyl or benzyl radical; $R_2$ represents a lower alkyl radical; and R represents a lower alkyl, vinyl, allyl, or ethinyl radical.

In accordance with the invention, compounds of the above formula are prepared by reacting an estradiol compound of the formula

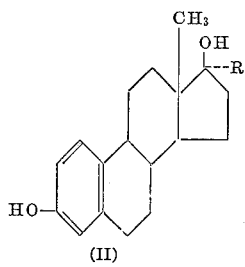

with an aminoalkyl halide of the formula

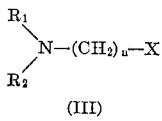

in the presence of a base. In the above formulas X represents a halogen atom, preferably bromine or chlorine, and $n$, R, $R_1$, and $R_2$ have the same significance as in Formula I. The reaction is suitably carried out in an alcoholic solvent such as ethanol, n-propanol, isopropanol, and the like; other solvents, such as water and N,N-dimethylformamide, and mixtures of these with alcohols, may also be used. The temperature and duration of the reaction may be varied over a wide range from 25° C. for 16–24 hours to the reflux temperature of the solvent for 30–60 minutes. A preferred method is to reflux an ethanolic solution of the reactants for 30–60 minutes. Equimolar amounts of the reactants may be used; it is preferable, however, to employ the aminoalkyl halide and the base in slight excess. When the aminoalkyl halide is introduced into the reaction as an acid-addition salt, additional base is required. Preferred bases for the reaction are the alkali metal hydroxides, sodium hydroxide and potassium hydroxide.

The compounds of the invention can exist in the free base form having Formula I or in the form of one of their acid-addition salts with a variety of inorganic or organic acids. Some representative nontoxic, pharmaceutically-acceptable acid-addition salts are the hydrochloride, hydrobromide, hydriodide, sulfate, phosphate, citrate, acetate, tartrate, benzoate, benzene-sulfonate, and the like. When it is desired to employ the compounds of the invention in the form of one of their acid-addition salts, the salt formation is suitably carried out by reacting the selected base with the selected acid in an unreactive solvent. The acid-addition salts can be converted to the free bases by reaction with a base such as sodium hydroxide or potassium hydroxide.

The compounds of the invention are useful pharmacological agents, exhibiting hormonal activity. They are anti-fertility agents and hypocholesteremic agents that exhibit a low degree of estrogenicity. They are, in addition, pituitary inhibitors. They are active upon oral administration.

The invention is illustrated by the following examples.

*Example 1*

A mixture of 2.9 g. of 17α-ethinylestradiol, 1.6 g. of N,N-dimethyl-O-chloroethylamine hydrochloride, and 4.1 ml. of 5 N aqueous potassium hydroxide in 50 ml. of ethanol is heated under reflux for 45 minutes. After cooling, the mixture is diluted with water and extracted with ether. The ether solution is washed first with Claisen's alkali (prepared by dissolving 35 g. of potassium hydroxide in 25 ml. of water, cooling, and diluting the solution with 100 ml. of methanol), then several times with water, and is dried over anhydrous magnesium sulfate. The dried solution is evaporated to dryness, and the 3-(β-dimethylaminoethoxy)-estra-1,3,5(10)-trien-17α-ethinyl-17β-ol obtained is recrystallized from methanol; M.P. 162–164.5° C.

An ethereal solution of 3-(β-dimethylaminoethoxy)-estra-1,3,5(10)-trien-17α-ethinyl-17β-ol is treated with a slight excess of hydrogen chloride, the resulting mixture is concentrated, and the precipitated hydrochloride salt of 3-(β-dimethylaminoethoxy)-estra-1,3,5(10)-trien-17α-ethinyl-17β-ol is isolated by filtration, washed with ether, and dried.

*Example 2*

A mixture of 2.9 g. of 17α-ethinylestradiol, 2.1 g. of N,N-diethyl-γ-chloropropylamine hydrochloride, and 4.1 ml. of 5 N aqueous potassium hydroxide in 50 ml. of ethanol is heated under reflux for 45 minutes. After cooling, the mixture is diluted with water, and extracted with ether. The ethereal extract is diluted with an equal volume of benzene, and the solution is washed first with Claisen's alkali, then with water, and is extracted with an aqueous solution of citric acid. The aqueous solution, containing the citrate salt of 3-(γ-diethylaminopropoxy)-estra-1,3,5(10)-trien-17α-ethinyl-17β-ol, is washed with ether and made alkaline with 2 N aqueous sodium hydroxide. The alkaline mixture is extracted with ether, and the ether solution is washed with water, dried over anhydrous magnesium sulfate, and evaporated to dryness to give the desired 3-(γ-diethylaminopropoxy)-estra-1,3,5(10)-trien-17α-ethinyl-17β-ol, M.P. 86.5–88.5° C., after recrystallization from n-hexane.

In the above procedure, equivalent amounts of N,N-diethyl-γ-bromopropylamine hydrochloride and sodium hydroxide may be substituted for N,N-diethyl-γ-chloropropylamine hydrochloride and potassium hydroxide, respectively, to prepare the same product.

*Example 3*

A mixture of 2.9 g. of 17α-ethinylestradiol, 2.4 g. of N - benzyl - N - methyl-β-chloroethylamine hydrochloride, and 4.1 ml. of 5 N aqueous potassium hydroxide in 75 ml. of ethanol is heated under reflux for 45 minutes. After cooling, the mixture is diluted with water, and extracted with ether. The ethereal extract is diluted with an equal volume of benzene, and the solution is washed first with Claisen's alkali, then with water, and is extracted with an aqueous solution of citric acid. The aqueous solution, containing the citrate salt of 3-[β-(N-benzyl-N-methylamino)-ethoxy]-estra-1,3,5(10)-trien-17α-ethinyl-17β-ol, is washed with ether and made alkaline with 2 N aqueous sodium hydroxide. The alkaline mixture is extracted with ether and the ether solution is washed with water, dried over anhydrous magnesium sulfate, and evaporated to dryness to give the desired 3-[β-(N-benzyl-N-methylamino) - ethoxy]-estra-1,3,5(10)-trien-17α-ethinyl-17β-ol.

The free base is dissolved in ether, the ether solution is treated with a slight excess of hydrogen chloride, the resulting mixture is concentrated, and the precipitated 3-[β-(N-benzyl-N-methylamino)-ethoxy]-estra-1,3,5(10)-trien-17α-ethinyl-17β-ol hydrochloride hemi-hydrate is isolated by filtration, washed with ether, and dried; M.P. 117–119° C.

By employing the procedure described above, from 2.9 g. of 17α-ethinylestradiol and 3.0 g. of N-benzyl-N-methyl-γ-bromopropylamine hydrochloride, there is obtained 3-[γ-(N-benzyl - N - methylamino)-propoxy]-estra-1,3,5-(10)-trien-17α-ethinyl-17β-ol, M.P. 89–91° C., after recrystallization from a mixture of acetone and n-hexane.

*Example 4*

A mixture of 2.8 g. of 17α-methylestradiol, 1.7 g. of N,N-dimethyl-γ-chloropropylamine hydrochloride, and 4.1 ml. of 5 N aqueous potassium hydroxide in 50 ml. of ethanol is heated under reflux for 45 minutes. After cooling, the mixture is diluted with water and extracted with ether. The ether solution is washed first with Claisen's alkali, then several times with water and is dried over anhydrous magnesium sulfate. The dried solution is evaporated to dryness, and the 3-(γ-dimethylaminopropoxy)-estra - 1,3,5(10) - trien-17α-methyl-17β-ol obtained is recrystallized from n-hexane; M.P. 85–86° C.

In the foregoing procedure, 3.0 g. of 17α-ethylestradiol and 1.6 g. of N,N-dimethyl-β-chloroethylamine hydrochloride may be substituted for the 17α-methylestradiol and the N,N-dimethyl-γ-chloropropylamine hydrochloride, respectively, to prepare 3-(β-dimethylaminoethoxy)-estra-1,3,5(10)-trien-17α-ethyl-17β-ol, M.P. 66–68° C., after recrystallization from n-hexane.

*Example 5*

A mixture of 3.1 g. of 17α-n-propylestradiol, 1.7 g. of N,N-dimethyl-γ-chloropropylamine hydrochloride and 4.1 ml. of 5 N aqueous potassium hydroxide in 75 ml. of ethanol is heated under reflux for 45 minutes. After cooling, the mixture is diluted with water and extracted with ether. The ethereal extract is diluted with an equal volume of benzene and the solution is washed first with Claisen's alkali, then with water and is extracted with an aqueous solution of citric acid. The aqueous solution, containing the citrate salt of 3-(γ-dimethylaminopropoxy) - estra - 1,3,5(10) - trien-17α-n-propyl - 17β - ol, is washed with ether and made alkaline with 2 N sodium hydroxide. The alkaline mixture is extracted with ether and the ether solution is washed with water, dried over anhydrous magnesium sulfate and evaporated to dryness to give the desired 3-(γ-dimethylaminopropoxy)-estra-1,3,5(10)-trien-17α-n-propyl-17β-ol. The free base is dissolved in ether, the solution is treated with an excess of dry hydrogen chloride and the hydrochloride salt obtained is purified by sublimation; M.P. 208–210° C.

*Example 6*

A mixture of 3.0 g. of 17α-vinylestradiol, 1.7 g. of N,N-dimethyl-γ-chloropropylamine hydrochloride and 4.1 ml. of 5 N aqueous potassium hydroxide in 75 ml. of ethanol is heated under reflux for 45 minutes. After cooling, the mixture is diluted with water and extracted with ether. The ethereal extract is diluted with an equal volume of benzene and the solution is washed first with Claisen's alkali, then with water and is extracted with an aqueous solution of citric acid. The aqueous solution, containing the citrate salt of 3-(γ-dimethylaminopropoxy)-estra-1,3,5(10)-trien-17α-vinyl-17β-ol, is washed with ether and made alkaline with 2 N sodium hydroxide. The alkaline mixture is extracted with ether and the ether solution is washed with water, dried over anhydrous magnesium sulfate and evaporated to dryness to give the desired 3-(γ-dimethylaminopropoxy)-estra-1,3,5(10)-trien-17α-vinyl-17β-ol, M.P. 83.5–85.5° C., after recrystallization from n-hexane.

*Example 7*

A mixture of 3.1 g. of 17α-allylestradiol, 1.7 g. of N,N-dimethyl-γ-chloropropylamine hydrochloride and 4.1 ml. of 5 N aqueous potassium hydroxide in 75 ml. of methanol is heated under reflux for 45 minutes. After cooling, the mixture is diluted with water and extracted with ether. The ethereal extract is diluted with an equal volume of benzene and the solution is washed first with Claisen's alkali, then with water and is extracted with an aqueous solution of citric acid. The aqueous solution, containing the citrate salt of 3-(γ-dimethylaminopropoxy)-estra-1,3,5(10)-trien-17α-allyl-17β-ol, is washed with ether and made alkaline with 2 N sodium hydroxide.

The alkaline mixture is extracted with ether and the ether solution is washed with water, dried over anhydrous magnesium sulfate and evaporated to dryness to give the desired 3-(γ-dimethylaminopropoxy)-estra - 1,3,5(10)-trien-17α-allyl-17β-ol, M.P. 72–74° C., after recrystallization from n-hexane.

We claim:

1. A member of the class consisting of 3-(aminoalkoxy) estra-1,3,5(10)-trien-17β-ol compounds of the formula

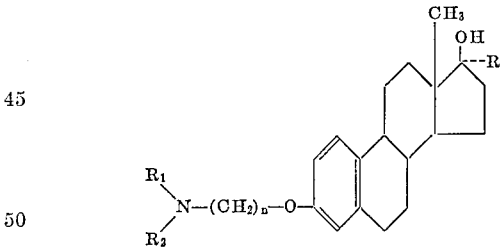

and pharmaceutically acceptable acid-addition salts thereof; where $n$ is a positive integer greater than 1 and less than 6; $R_1$ is chosen from the class consisting of lower alkyl and benzyl; $R_2$ represents lower alkyl; and R is chosen from the class consisting of lower alkyl, vinyl, allyl, and ethinyl.

2. 3-(β-dimethylaminoethoxy)-estra-1,3,5(10) - trien-17α-ethinyl-17β-ol.

3. 3-[γ-(N-benzyl-N-methylamino)-propoxy] - estra-1,3,5(10)-trien-17α-ethinyl-17β-ol.

4. 3 - (γ-dimethylaminopropoxy) - estra - 1,3,5(10)-trien-17α-methyl-17β-ol.

References Cited by the Examiner

UNITED STATES PATENTS

| | | | |
|---|---|---|---|
| 3,060,204 | 10/62 | Cantrell et al. | 260—397.5 |
| 3,076,826 | 2/63 | Clinton et al. | 260—397.5 |
| 3,076,829 | 2/63 | Reimann et al. | 260—397.45 |
| 3,094,541 | 6/63 | Cantrall et al. | 260—397.5 |
| 3,107,257 | 10/63 | Counsell | 260—297.5 |

LEWIS GOTTS, *Primary Examiner.*